United States Patent [19]

Connelly et al.

[11] Patent Number: 5,667,276
[45] Date of Patent: Sep. 16, 1997

[54] LOCKING HEADREST SUPPORT ASSEMBLY

[75] Inventors: John M. Connelly, Tinley Park; Sven E. Carlson, New Lenox, both of Ill.

[73] Assignee: Illinois Tool Works Inc., Glenview, Ill.

[21] Appl. No.: 580,755

[22] Filed: Dec. 29, 1995

[51] Int. Cl.⁶ .................................................. A47C 1/10
[52] U.S. Cl. ...................... 297/410; 297/463.1; 297/391
[58] Field of Search .................................. 297/410, 396, 297/391, 463.1

[56] References Cited

U.S. PATENT DOCUMENTS

| | | | |
|---|---|---|---|
| 4,411,470 | 10/1983 | Nishimura et al. | 297/410 |
| 4,527,834 | 7/1985 | Zyngier | 297/410 |
| 4,577,904 | 3/1986 | Wise et al. | 297/410 |
| 4,589,698 | 5/1986 | Suzuki | 297/410 |
| 4,604,777 | 8/1986 | Meeks | 297/410 X |
| 4,657,297 | 4/1987 | Ishibashi | 297/410 X |
| 4,976,493 | 12/1990 | Frankila | 297/410 |
| 5,156,440 | 10/1992 | Vidwans | 297/410 |
| 5,529,379 | 6/1996 | Stocker | 297/410 |

FOREIGN PATENT DOCUMENTS

| | | | |
|---|---|---|---|
| 3437803 | 6/1986 | Germany | 297/410 |

*Primary Examiner*—Laurie K. Cranmer
*Attorney, Agent, or Firm*—Kane, Dalsimer, Sullivan, Kurucz, Levy, Eisele and Richard, LLP

[57] ABSTRACT

A locking headrest support assembly for the back of a vehicle set includes a sleeve, a cap, a spring and a button. The sleeve is lockable within the back of a vehicle seat and has a longitudinal bore for a rod of a vehicle headrest. The cap locks onto the top of the sleeve, and has a longitudinal bore aligned with that of the sleeve when so locked. Alternatively, the cap and sleeve may be combined in one integral piece. The cap has a slot in which the button is disposed in a drawer-like fashion. The slot has two side walls, a rear wall, and a top and a bottom. The side walls each have a notch which defines a ledge. The notches are produced by holes directed into the cap from its underside, so that the holes may not be exposed to view when the locking headrest support assembly os fully assembled. The button has prongs which engage with the ledges and prevent the button from being withdrawn once the prongs have so engaged. The spring is disposed in the slot behind the button and has an elongated base member which crosses the bore when the button is not externally depressed to engage a headrest rod within the bore. The elongated base member is pushed out of the bore when the button is pushed so that the position of the headrest rod may be changed.

12 Claims, 6 Drawing Sheets

LOCKING HEADREST SUPPORT ASSEMBLY

BACKGROUND OF THE INVENTION

1. Field of the Invention

The present invention relates to a locking headrest support assembly for a vehicle seat. More specifically, the invention relates to such an assembly having a sleeve, which slidingly accommodates a rod of the headrest, and a cap at the upper end thereof including a locking device which engages with notches in the rod of the headrest to fix same in a desired vertical position.

2. Description of the Prior Art

Locking headrest support assemblies of the subject type are made of synthetic material or metal, and are inserted from above into the backs of vehicle seats. They enable the accommodation of a rod of a headrest in sliding engagement so that the headrest may be adjusted in height. Through a corresponding frictional engagement or a releasable arresting means, the headrest may be adjusted to the respectively desired height.

The prior art is replete with assemblies of the subject type. For example, U.S. Pat. No. 4,577,904 shows a guiding sleeve for headrests at vehicle seats, wherein the sleeve slidingly accommodates a rod of the headrest. At the upper end of the sleeve is an arresting device provided with a handling means and cooperating with an arresting abutment at the lower end of the rod. The arresting device prevents the rod from being pulled out when the handling means is not actuated.

The sleeve has a bore which is provided with an enlargement at its upper end. The enlargement accommodates an elongated spring element which has a forward longitudinal side cooperating with the headrest rod and which has a rearward longitudinal side by which it is supported at the wall of the enlargement. The enlargement also accommodates an unlocking element having two parallel-spaced legs arranged therewithin. The legs are respectively disposed laterally of the sleeve bore. The ends of the legs cooperate with the ends of the spring element while being adapted to be moved by the handling means towards the spring element in the direction of their longitudinal extension.

Locking headrest support assemblies currently in use have non-functional, visible holes which are unattractive from an aesthetic point of view. Such holes are left behind by inserts during the molding process. The inserts provide ledges or other internal structure in the article being molded. In the above-described situation, the unlocking element has prongs which engage with a ledge or notch within the enlargement, so that the unlocking element may be held in place against the biasing force provided by the spring element.

The present locking headrest support assembly provides an improvement to those of the prior art by virtue of its lack of non-functional, visible holes when installed on the back of a vehicle seat.

SUMMARY OF THE INVENTION

Accordingly, the present invention is an improved locking headrest support assembly for the back of a vehicle seat. The invention comprises four parts: a sleeve, a cap, a spring and a button. Alternatively, sleeve and cap may be integrally molded with one another to form one part of a three-part locking headrest support assembly.

The sleeve is lockable into appropriate hardware within the back of a vehicle seat, and has a longitudinal bore to accommodate a rod for a locking headrest.

Where the cap is not integrally molded with the sleeve, it is lockable onto the top of the sleeve either before or after its installation into the back of a vehicle seat. In such event, locking means for joining the cap to the sleeve are provided on the underside of the cap and near the top of the sleeve. In any case, the cap has a longitudinal bore, which is aligned with that of the sleeve.

The cap also has a slot in a direction substantially transverse to the bore. The slot has a first side wall and a second side wall, a rear wall and a top and a bottom. The first and second side walls each have a notch defining a ledge. The ledges are provided by directing holes into the underside of the cap. These holes are not exposed to view when the locking headrest support assembly is installed in a vehicle seat back. The holes cut into the first and second side walls of the slot, and, in so doing, provide the notches therein which act as ledges.

The spring is disposed within the slot, and has a normal and a depressed position. The spring is formed of an elongated base member having a rearwardly bent leg on each of its two ends. The legs extend a predetermined distance from the elongated base member, so that, when the spring is in the normal position, the elongated base member crosses the bore a predetermined distance to engage a support rod for a headrest within the bore. When the spring is in the depressed position, the elongated base member does not cross the bore. As a consequence, a support rod for a headrest may be moved longitudinally when the spring is in the depressed position.

The button is movably disposed within the slot in the manner of a drawer. The button is the means by which the spring is moved between the normal and depressed positions. The button has prongs on opposite sides thereof, the prongs being engagable with the ledges in the slot so that, once the button is disposed within the slot, it may not be removed therefrom. The button engages with the elongated base member of the spring in order to compress the spring against the rear wall of the slot, thereby moving it from the normal to the depressed position. The button also maintains the spring in its normal position when not being pressed, the prongs on the button then engaging with the ledges in the side walls against the outward biasing action of the spring.

The present invention will now be described in more complete detail, with frequent reference being made to the figures, which are identified as follows.

DETAILED DESCRIPTION OF THE PREFERRED EMBODIMENT

Figure 1:
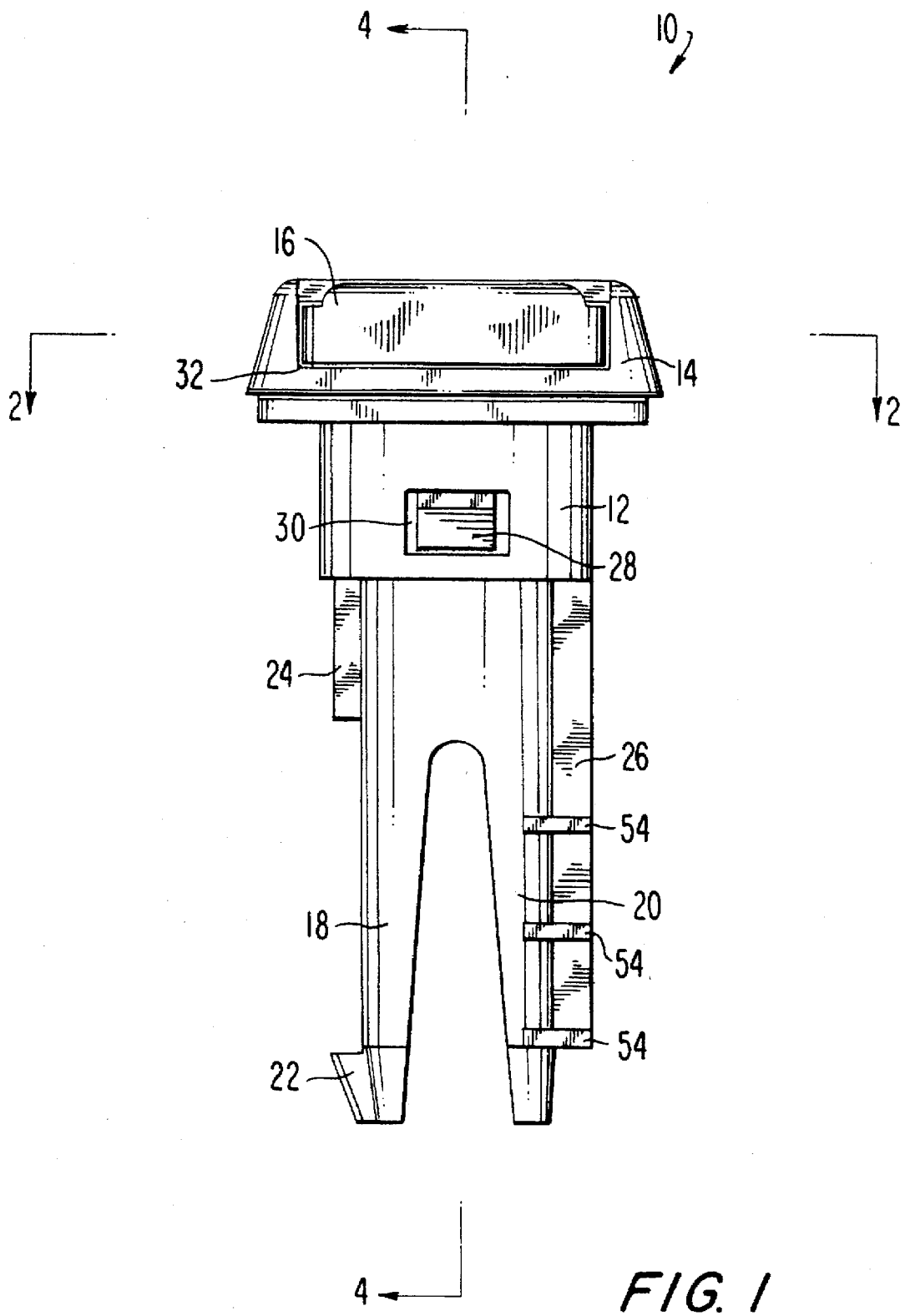
FIG. 1 is a front plan view of the locking headrest support assembly of the present invention.

Turning now specifically to FIG. 1, the locking headrest support assembly 10 of the present invention comprises a sleeve 12, a cap 14 and a button 16. Referring first to the sleeve 12, it may be provided with two tines 18, 20 in the manner of a fork. One tine 18 may be provided with a prong 22, which is intended to prevent the extraction of the sleeve from a hole in the back of a vehicle seat. The same tine 18 may also be provided with a locator rib 24, which orients the sleeve 12 in the proper direction within the hole in the vehicle seat. The other tine 20 may be provided with a side rib 26 which provides the sleeve 12 a tight fit in the hole in the vehicle seat.

The cap 14 snaps onto the top of the sleeve 12 by means of prongs 28 which engage outwardly through holes 30 in the sleeve 12. Alternatively, sleeve 12 and cap 14 may be integrally molded with one another to form a single piece lacking prongs 28. Cap 14 has a slot 32 into which button 16 is disposed in a drawer-like fashion.

Figure 2:
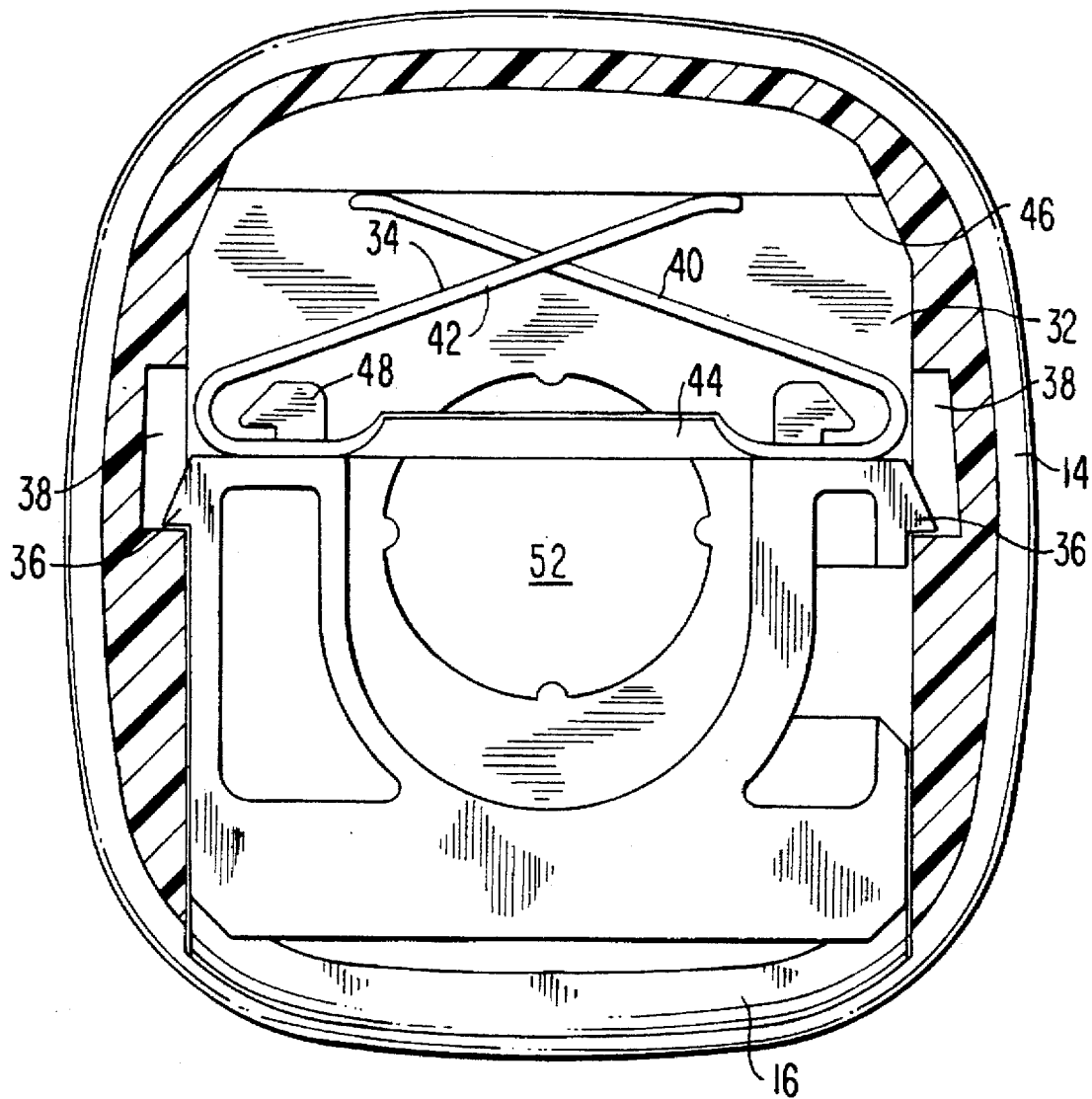
FIG. 2 is a partial cross section taken as indicated by line 2—2 in FIG. 1.

FIG. 2 is a partial cross-sectional view taken as indicated by line 2—2 in FIG. 1. The cross section is taken as indicated through cap 14 as shown, removing the top of the cap 14 to expose the contents of slot 32 to view. The cross section is partial to the extent that button 16 and spring 34 have not been sectioned for the sake of clarity.

The button 16 will be more completely described hereinbelow. For the moment, it is important to note that it includes prongs 36, which engage within ledges 38 provided in slot 32. Spring 34 outwardly biases button 16, and the engagement of prongs 36 against ledges 38 prevents the button 16 from being pushed from slot 32.

Spring 34 is attached to button 16, and is formed of flat spring steel. Spring 34 consists of two legs 40, 42 bent away in a rearward direction from an intermediate direction from an elongated base member 44. The legs 40, 42 intersect one another as shown. The intersection in the plane of the elongated base member 44 is made possible by legs 40, 42 being thinner than elongated base member 44. The ends of legs 40, 42 are arcuately bent, so that they come into contact against the rear wall 46 of slot 32 with relatively little friction. Elongated base member 44 of spring 34 may be rounded, as shown in FIG. 2, to engage more smoothly with the notches in a rod of a headrest, when the rod is disposed in bore 52.

Figure 3:
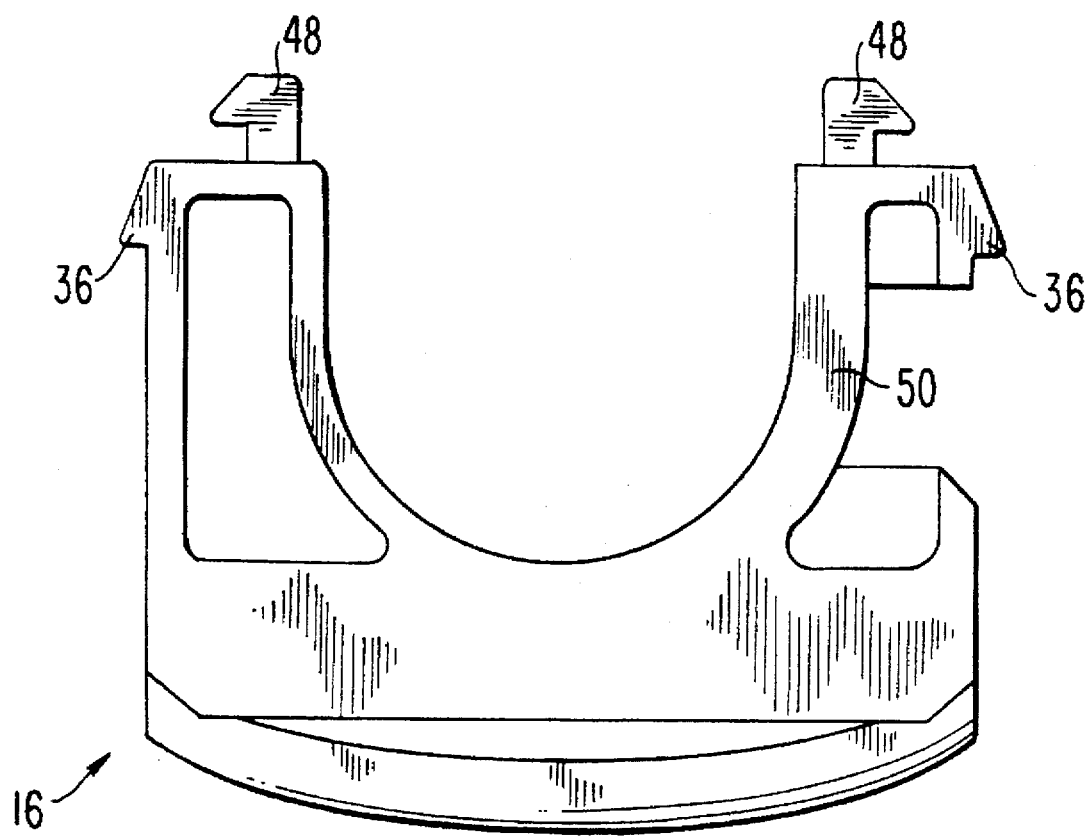
FIG. 3 is a plan view of the button for the locking headrest support assembly.

FIG. 3 is a plan view of button 16. In addition to prongs 36, the button 16 includes prongs 48, by which spring 34 may be attached thereto. Bunion 16 also includes a resilient arm 50, of which one of the two prongs 36 is an integral part. This enables the structure of the button 16 to flex as it is being inserted into slot 32 and prong 36 to snap into ledge 38, to keep button 16 within slot 32.

Figure 4:
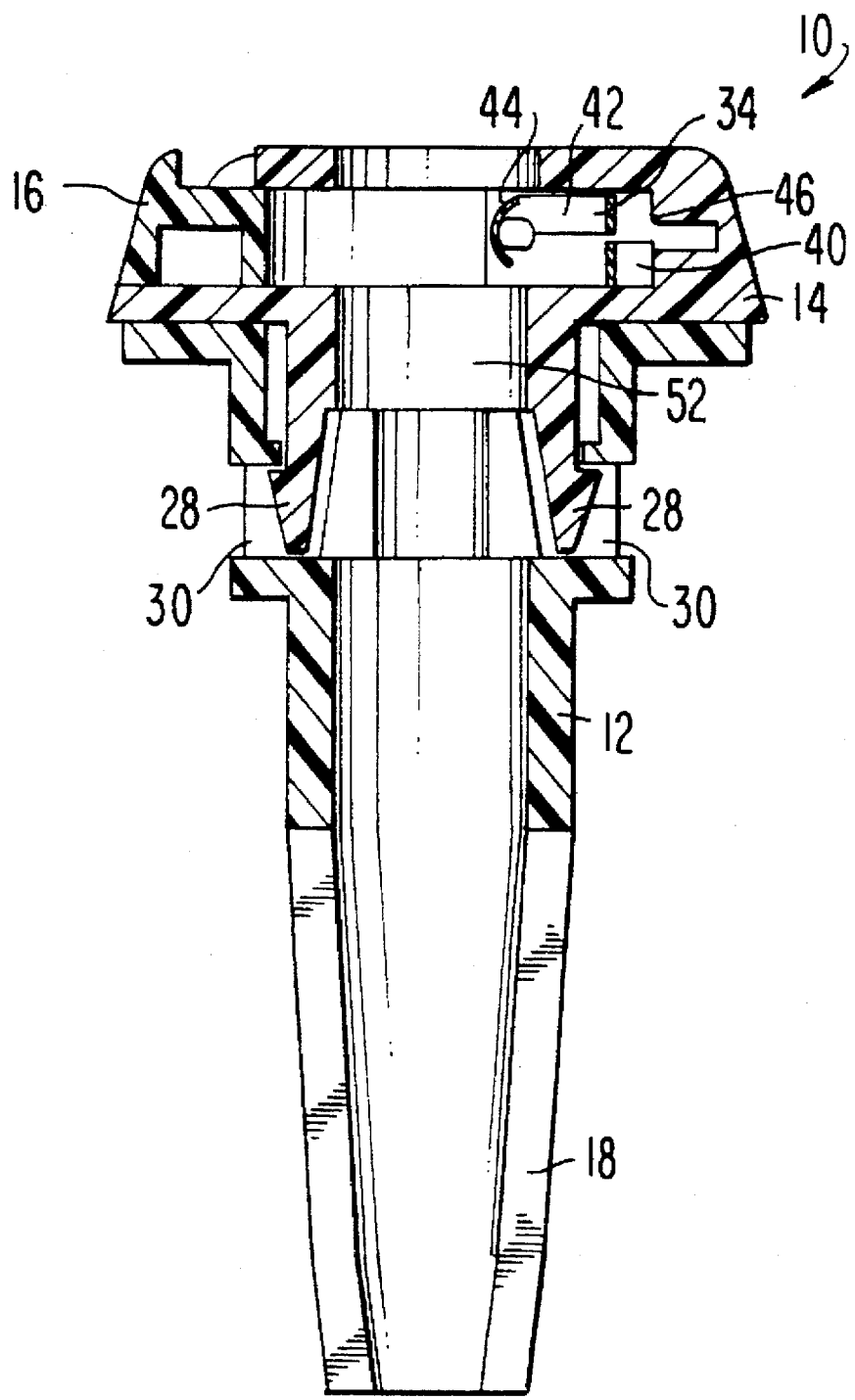
FIG. 4 is a cross-sectional view taken as indicated by line 4—4 in FIG. 1.

FIG. 4 is a cross-sectional view taken as indicated by line 4—4 in FIG. 1, and showing the relationship between the sleeve 12, cap 14, button 16 and spring 34. Cap 14 and sleeve 12 are joined by inserting prongs 28 of cap 14 into sleeve 12 and allowing prongs 28 to snap outwardly into holes 30. In practice, this arrangement will permit the sleeve 12 to be separately inserted into a hole in a seat back. Later, a fully assembled cap 14, that is, one having a button 16 and spring 34, may be snapped into the sleeve. Alternatively, sleeve 12 and cap 14 may be integrally molded as one piece without prongs 28 and holes 30.

Button 16 is disposed within the cap 14, and biased toward the left by spring 34. Elongated base member 44, as a result of the biasing, passes across bore 52 so that it may engage with a rod passing longitudinally through sleeve 12 and cap 14.

Figure 5:
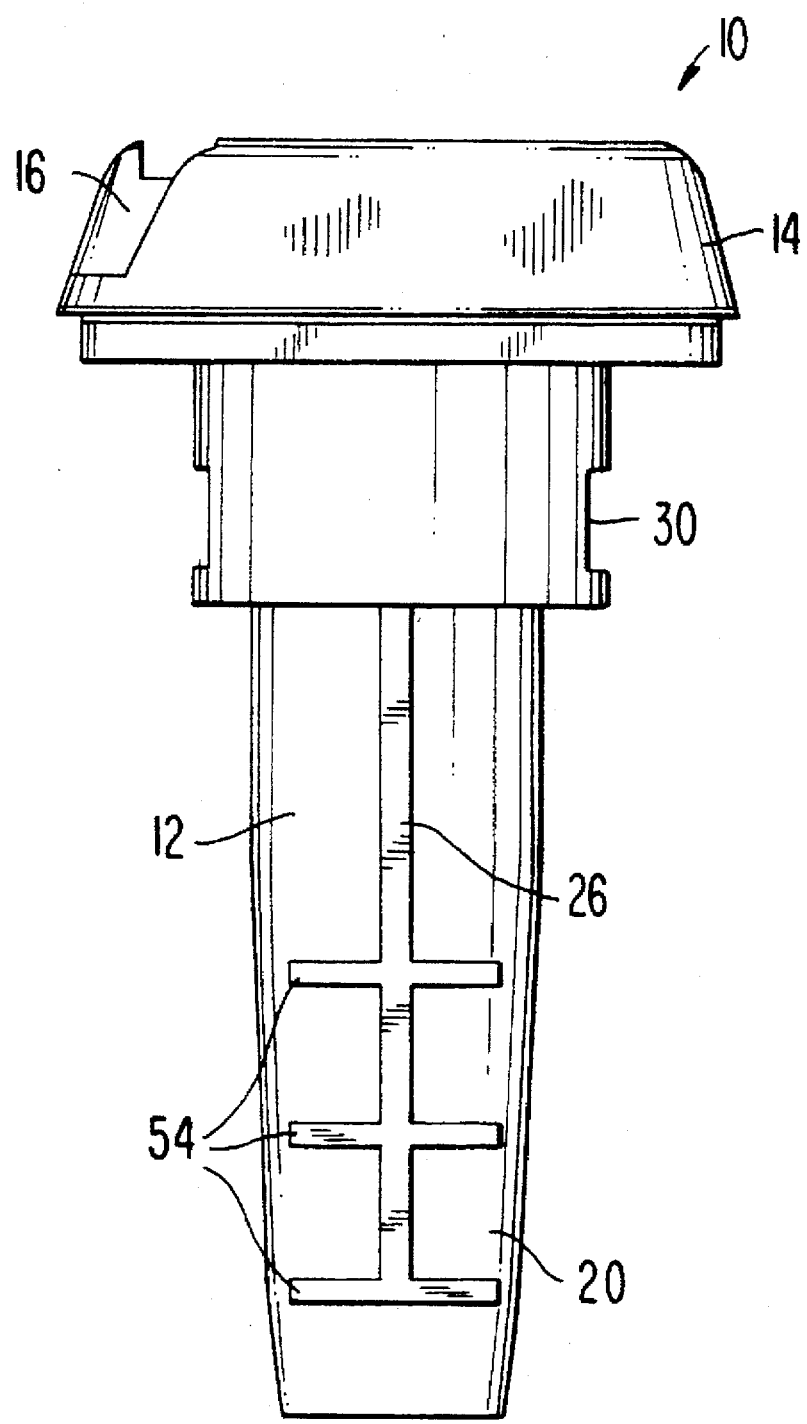
FIG. 5 is a side plan view of the locking headrest support assembly.

FIG. 5 is a side plan view of the locking headrest support assembly 10 taken from the right side of the front plan view given in FIG. 1. Tine 20 of sleeve 12 has side rib 26 and transverse ribs 54.

Figure 6:
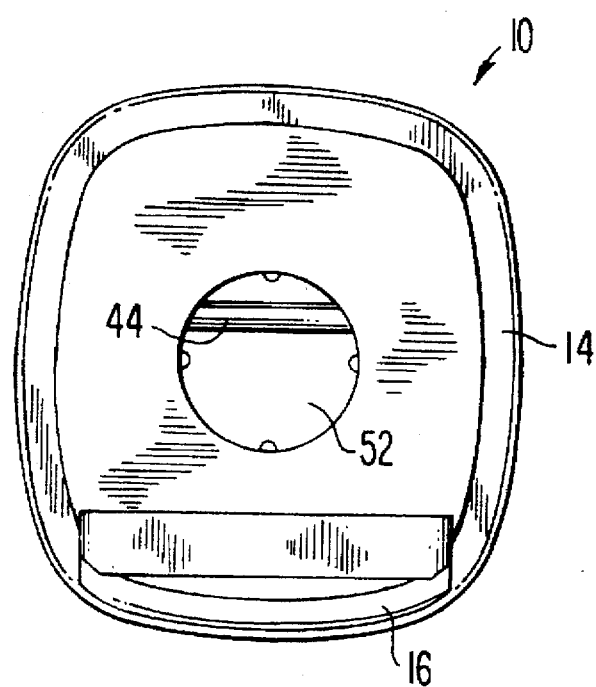
FIG. 6 is a top plane view thereof.

FIG. 6 is a top plan view of the locking headrest support assembly 10. Of interest is that elongated base member 44 of spring 34 intersects with bore 52 when pushing button 16 outwardly, engaging prongs 36 against ledges 38. When the rod of a headrest having the customary spaced notches is disposed within the bore 52, elongated base member 44 holds the rod, and, as a consequence, the headrest in a selected position relative to a seat back.

Figure 7:
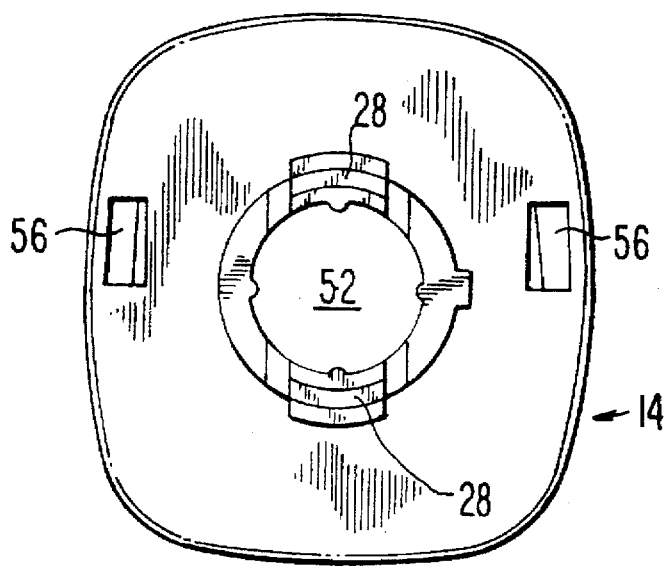
FIG. 7 is a plan view of the underside of the cap of the support assembly.

FIG. 7 is a plan view of the underside of the cap 14 when the cap 14 is being molded, inserts protrude into the mold cavity and ultimately produce holes 56 in the bottom of the cap 14. Holes 56 ultimately produce ledges 38 in slot 32. Holes 56, being on the underside of the cap 14 are hidden from view when the locking headrest support assembly 10 is installed in a vehicle seat back. Moles 56 are also provided when the cap 14 is integrally molded with the sleeve 12.

Sleeve 12, cap 14 and button 16 may all be molded from a polymeric resin material, such as high-density polyethylene (HDPE), and sleeve 12 and cap 14 may be integrally molded with one another of such material. Spring 34, as previously noted, may be of steel.

Modifications to the present invention may be obvious to those of ordinary skill in the art, and would not bring the invention so modified beyond the scope of the appended claims.

What is claimed is:

1. A locking headrest support assembly for the back of a vehicle seat, said assembly comprising;

a sleeve, said sleeve being lockable within the back of a vehicle seat and having a longitudinal bore;

a cap, said cap having an underside and a longitudinal bore and being connected to said sleeve, said longitudinal bore of said cap being aligned with said longitudinal bore of said sleeve, said cap further having a slot formed in said underside in a direction substantially transverse to said bore having a first side wall and a second side wall, a rear wall and a top and a bottom, said first and second side walls each having a notch defining a ledge, said ledges being sides of holes into said underside of said cap, said holes not being exposed to view when said locking headrest support assembly is installed on the back of a vehicle seat;

a spring disposed within said slot, said spring having a normal and a depressed position and being formed of an elongated base member, said elongated base member having a rearwardly bent leg on each of its ends, said legs extending a predetermined distance from said elongated base member so that, when said spring is in said normal position, said elongated base member crosses said bore a predetermined distance to engage a headrest rod within said bore and, when in said depressed position, does not cross said bore; and a button, said button being movably disposed within said slot in a drawer-like fashion, said button having prongs on opposite sides thereof, said prongs being engagable with said ledges in said slot, so that, once said button is disposed within said slot, said button may not be removed therefrom, said button engaging said elongated base member of said spring for compressing same against said rear wall of said slot to move it from said normal to said depressed position and for maintaining same in said normal position when not being pressed, when said prongs of said button engage with said ledges of said side walls of said slot against the biasing action of said spring.

2. A locking headrest support assembly as claimed in claim 1 wherein said sleeve comprises a first tine and a second tine.

3. A locking headrest support assembly as claimed in claim 2 wherein said first tine comprises a prong to prevent the extraction of the sleeve from a hole in the back of a vehicle seat.

4. A locking headrest support assembly as claimed in claim 2 wherein said second tine comprises a longitudinally extending side rib to ensure the tight fit of the sleeve in a hole in the back of a vehicle seat.

5. A locking headrest support assembly as claimed in claim 1 wherein said legs of said spring have arcuately bent ends, so that they may slide against the rear wall of said slot with a minimal amount of friction.

6. A locking headrest support assembly as claimed in claim 1 wherein said elongated base member of said spring is rounded in a direction transverse to its length.

7. A locking headrest support assembly as claimed in claim 1 wherein said button comprises a substantially flat body having a resilient arm, wherein one of said prongs is an integral part of said resilient arm, so that said button may flex when inserted into said slot and said prongs may snappingly engage with said ledges.

8. A locking headrest support assembly as claimed in claim 1 wherein said sleeve and said cap comprise one integral piece.

9. A locking headrest support assembly as claimed in claim 1 wherein said underside of said cap includes means for locking said cap onto said sleeve.

10. A locking headrest support assembly as claimed in claim 1 wherein said cap, said sleeve and said button are molded from a polymeric resin material.

11. A locking headrest support assembly as claimed in claim 10 wherein said cap and said sleeve are integrally molded with one another.

12. A locking headrest support assembly as claimed in claim 10 wherein said polymeric resin material is high-density polyethylene (HDPE).

* * * * *